May 9, 1967  A. T. BUTTRISS  3,318,558
FASTENING DEVICE AND ASSEMBLY
Original Filed Aug. 31, 1964  2 Sheets-Sheet 1

INVENTOR.
ALBERT T. BUTTRISS
BY
ATTORNEYS

May 9, 1967  A. T. BUTTRISS  3,318,558
FASTENING DEVICE AND ASSEMBLY
Original Filed Aug. 31, 1964  2 Sheets-Sheet 2

INVENTOR.
ALBERT T. BUTTRISS
BY
*Teare, Teare & Sammon*
ATTORNEYS

United States Patent Office 3,318,558
Patented May 9, 1967

---

3,318,558
FASTENING DEVICE AND ASSEMBLY
Albert T. Buttriss, Westlake, Ohio, assignor to Tinnerman Products, Inc., a corporation of Ohio
Original application Aug. 31, 1964, Ser. No. 393,160. Divided and this application Mar. 17, 1966, Ser. No. 535,085
11 Claims. (Cl. 248—27)

This is a division of the copending application to Albert T. Buttriss, Ser. No. 393,160, filed Aug. 31, 1964 now Patent No. 3,279,727.

This invention relates to fastening devices, and more particularly to fastening devices and an assembly for mounting an article on an apertured support member, such as a panel or the like.

More specifically, the present invention is directed to fastening devices constructed for use in mounting articles or objects, such as moldings, trim strips, inspector plates, covers, electrical elements or the like, through an opening in a support member, such as a panel, chassis, frame, modules, circuit rack or the like, for rigidly mounting the same in applied position without danger of loosening or being inadvertently removed therefrom incident to vibration, jarring and strain which may be imported to the supporting member.

A specific illustration of the use to which the fastening devices of this invention may be applied is the mounting of an electrical element, such as a connector, for various types of electronic installations. In mounting such connectors, it is essential that the fastening device be capable of being easily and quickly applied with a firm, rigid engagement in the applied position on the support member, in order to withstand the jarring and stress and/or strain forces incident to such installation, particularly when one or more of the connectors has been removed or is missing from the installation. Furthermore, it is essential that the fastening devices be capable of being easily and quickly applied to the connector, particularly when access for positioning the fastener may be achieved principally from one side only of the device to which the connector is intended to be attached. Moreover, it is important that such attachment is readily achieved regardless of substantial tolerance variations between the parts, and without the necessity of having to use conventional type nut and bolt or rivet-type arrangements to achieve the attachment.

The present invention contemplates the provision of a fastening device for mounting an article, such as an electrical connector, on an apertured support member through the medium of a projecting portion which may form a part of the article and which may be inserted through a window-like opening construction provided in the fastener, and which will, by the act of insertion, automatically coact therewith to prevent any movement of the article relative to the panel in the installed position of the fastener.

Accordingly, an object of the present invention is to provide a fastening device which is of a relatively simple construction and which is inexpensive to produce for quickly and easily mounting an article, such as an electrical connector, to an apertured support member.

Another object of the present invention is to provide a fastening device of the character described which may be readily attached to a support member and which includes a window-like construction through which may be inserted a projecting portion of an article, and which will, by the act of insertion, automatically coact therewith to prevent movement of the connector in mounted position on the support member.

A further object of the present invention is to provide a combination of article and fastening device by use of which the article and fastener, as a unit, may be applied through an opening in a support member and thereby achieve an automatic locking coaction between the article and support member in the installed position thereof.

Further objects and advantages of the present invention will be apparent to those skilled in the art as the description herein proceeds with reference to the accompanying drawings, in which like reference characters designate like parts throughout, and in which.

Figure 1:
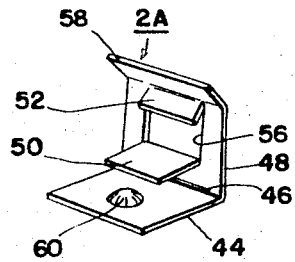
FIG. 1 is a perspective view of one form of the fastening device made in accordance with the present invention.
Figure 2:
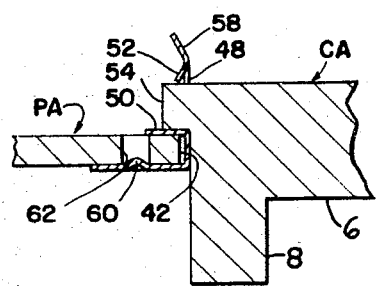
FIG. 2 is a sectional view showing one end of an article, such as an electrical connector, mounted through the opening of a support member by means of the fastening device shown in FIG. 1.

Referring now again to the drawings, and in particular to FIGS. 1 and 2 thereof, the fastening device, designated generally at 2A, is shown in connection with a support member PA, such as a panel, having an opening 42 for mounting therethrough an article CA, such as an electrical connector. In the embodiment shown, the connector includes a body 6 made preferably from an electrical insulating material, such as a ceramic or polymeric material having electrical insulating characteristics. The connector body 6 includes a pair of spaced, vertically extending legs 8 (only one shown) adapted to extend through the panel opening 42, and a pair of flanged ends 54 (only one shown) projecting laterally outwardly from opposed ends of the body 6 adapted to overlie the upper marginal portions of the panel immediately adjacent the opening 42 therein. The connector CA may be provided with a plurality of upstanding connector elements (not shown) for coupling to a source of electrical power.

It is contemplated that the fastening device be made from a single piece of strip material preferably that of a spring-like nature, such as spring steel or cold rolled metal having spring-like characteristics. In this form, the strip of material is formed to provide a substantially planar or flat leg 44 adapted for engagement adjacent the confronting undersurface of the panel adjacent the opening 42 therein. The leg 44 may be bent along a bend line 46 to provide a yieldable arm 48 which projects upwardly and normally from the general plane of the leg 46. In the embodiment shown, the arm 48 is preferably struck-out adjacent one end and entirely within its margins to provide a resilient tongue 50 which is spaced laterally from and which extends in the same general direction as the leg 44 to define therewith a generally U-shaped clip arrangement for attachment to the panel.

The arm 48 is also preferably struck-out adjacent its other end to provide a resilient finger 52 which projects outwardly and downwardly from the general plane of the arm 48 for engagement with the upper surface of one of the flanged ends 54 of the connector. The struck-out tongue 50 and finger 52 construction together define a generally polygonal, such as rectangular shape, window-like opening 56 adapted to slidably, yet snugly receive therethrough one of the flanged ends 54 of the connector upon assembly with the fastener, as aforesaid. The free end of the arm 48 may be bent to provide an upwardly and angularly extending flange 58 to facilitate attachment to the connector and to rigidify the fastener in that area upon assembly with the connector. The material of the leg 44 may be depressed to provide a generally peripherally-continuous projection 60 which extends upwardly from the general plane of the leg 44 and which is adapted for coacting engagement within an aperture 62 provided in the panel adjacent the panel opening 42, thereby to prevent movement of the fastener in the assembled position with the panel.

In assembly, a pair of the fastening devices 2A (only one shown) may be attached to the panel PA simply by securing the marginal portions of the panel between the U-shaped construction defined by the leg 44 and the resilient tongues 50 of the respective fastening devices. Thus assembled, the marginal portions of the panel are clamped between the leg 44 and tongue 50 of each of the respective fasteners so that the projection 60 on each of the tongues is disposed for coacting engagement within the aperture, such as 62, provided in the panel on opposite sides of the opening 42 therein. The flanged ends, such as the end 54, of the connector may then be inserted through the window-like opening 56 in the yieldable arm 48 of the respective fastener. Upon insertion, the resilient finger 52 snaps into engagament against the confronting upper surface of the flanged end. Thus inserted, the flanged ends of the connector are automatically clamped between the tongue 50 and finger 52, thereby to prevent any lateral or axial movement of the connector relative to the panel in the installed position thereof.

Figure 3:
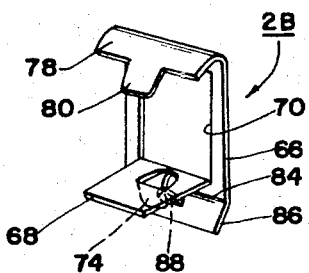
FIG. 3 is a perspective view of a modification of the fastening device made in accordance with present invention.
Figure 4:
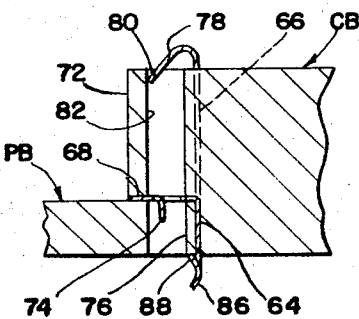
FIG. 4 is a sectional view showing one end of an article, such as an electrical connector, mounted through an opening in a support member by means of the fastening device shown in FIG. 3.
Figure 5:
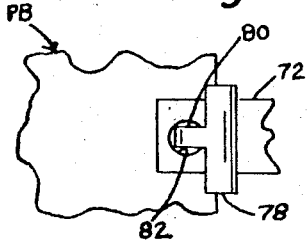
FIG. 5 is a top plan view of the assembly shown in FIG. 4.

In FIGS. 3, 4 and 5 there is illustrated another modification of the fastening device, designated generally at 2B, which is generally similar in application to that shown in FIGS. 1 and 2 for mounting a connector CB to an opening 64 in a support member PB, such as a panel. In this form, the strip of material is formed to provide a generally flat base 66. The material of the base 66 is preferably struck-out centrally thereof to provide a resilient tongue 68 which extends outwardly from and generally normal to the base. Hence, by the tongue 68 being struck-out, there is provided a polygonal, such as rectangular shaped, window-like opening 70 adapted to slidably, yet snugly receive therethrough a flanged end 72 of the connector CB, as aforesaid. The tongue 68 is preferably struck-out to provide a tab 74 which is adapted to be engageably disposed within an aperture 76 provided in the panel adjacent the panel opening 64 to prevent movement of the fastener relative to the panel.

As shown in this form, the base 66 is preferably bent adjacent its upper end to provide a curved flange 78 which extends outwardly and angularly downwardly in the general direction of the tongue 68 for engagement against the confronting upper surface of the flanged end 72 of the connector. The flange 78 may be provided with a resilient finger 80 extending in the same general direction thereof and having a substantially reduced transverse dimension compared to the transverse dimension of the flange 78 itself so that the finger 80 may readily be disposed for coacting engagement within a generally vertically extending opening 82 provided in the flanged end 72, thereby to prevent movement of the connector relative to the panel in the installed position of the fastener. The base 66 is preferably bent adjacent its other or lower end along the bend line 84 to provide a downwardly and angularly inwardly extending portion 86 which is struck-out to provide another tab 88 which extends outwardly and angularly upwardly in the general direction of the tongue 68 for engagement against the lower or undersurface of the panel adjacent the panel opening 64. Hence, in the assembled position, the tab 74 of the tongue 68 combines with the tab 88 of the portion 86 to prevent movement, and particularly any lateral shifting movement of the fastener relative to the panel.

In assembly of this form, however, a pair of the fasteners 2B may be attached first to the connector CB simply by inserting the flanged ends, such as end 72, through the window-like opening 70 provided in the base 66 of the respective fasteners. Upon insertion, the resilient fingers 80 of the associated one of the fasteners snaps into engagement within the opening 82 provided in the flanged end 72 of the connector. The connector and depending fasteners may then be inserted, as a unit, through the opening 64 in the panel so that tab 74 of the tongue 68 is disposed within the aperture 76 of the panel and the tab 88 of the portion 86 is snapped into engagement against the confronting underside of the panel adjacent the opening 64, thereby to prevent movement of the connector relative to the panel in the installed position of the fasteners.

Figure 6:
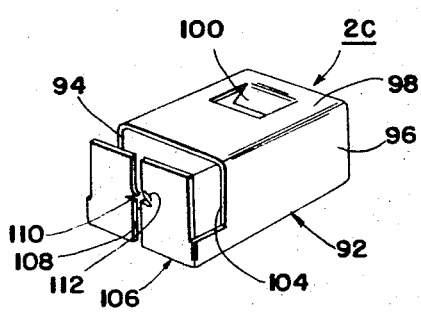
FIG. 6 is a perspective view of another modification of the fastening device made in accordance with the present invention.
Figure 7:
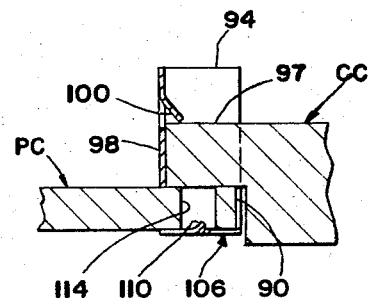
FIG. 7 is a sectional view showing one end of an article, such as an electrical connector, mounted through an opening in a support member by means of the fastening device shown in FIG. 6.

In FIGS. 6 and 7 there is illustrated another modification of the fastening device, designated generally at 2C, which is generally similar in application to that shown in FIGS. 3 and 4 for mounting a connector CC through an opening 90 in a support member PC, such as a panel. In this form, however, the strip of material may be formed so as to provide what may be termed a box-like construction comprising a generally U-shaped body 92 which is preferably open at one end and along one side thereof. The body 92 includes and is defined by a pair of spaced, side walls 94 and 96 which extend outwardly and generally normal to an end wall 98. The side walls 94 and 96 are preferably spaced apart a distance sufficient to slidably, yet snugly receive in locking engagement therebetween a flanged end 97 of the connector in assembled position with the fastener. The end wall 98 may be struck-out adjacent its upper end thereof to provide a resilient tongue 100 which extends downwardly and angularly inwardly therefrom for engagement with the top or upper surface of the flanged end 97, thereby to lock the connector against vertical movement when assembled with the panel.

The end wall 98 and side walls 94 and 96 are conjointly cut out, as at 104, to provide a generally L-shaped resilient arm 106 which extends outwardly and generally transversely relative to the end wall 98 to provide a clip-like device for attachment to the marginal portions of the panel adjacent the panel opening 90. The arm 106 may be split transversely across its width, as at 108, and struck-out to provide a pair of oppositely disposed, generally polygonal, such as triangular shaped, projections 110 and 112 which extend upwardly therefrom for coacting engagement within an aperture 114 provided in the panel adjacent the panel opening 90 to prevent movement of the fastener, particularly lateral shifting movement thereof relative to the panel.

In assembly, a pair of the fasteners 2C may be attached to the panel PC simply by snapping the resilient L-shaped arm 106 of the associated fastener into engagement with the marginal portions of the panel adjacent the opening 90 therein. Thus attached, the projections 110 and 112 of the arm are disposed for engagement within an aperture 114 provided in the panel to prevent movement of the fastener in the installed position on the panel. The connector CC may then be attached to the mounted fasteners by inserting the flanged ends, such as end 97, down through the U-shaped body 92 of each of the fasteners so that the flanged end is engageably retained by the end 98 and side walls 94 and 96 thereof. Upon insertion the resilient tongue 100 snaps into engagement against the confronting upper surface of the flanged end, thereby to prevent movement of the connector relative to the panel in the installed position of the fastener.

Figure 8:
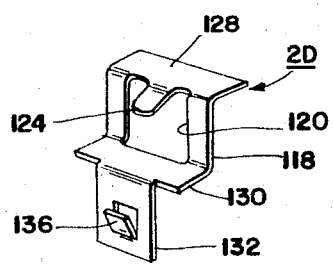
FIG. 8 is a perspective view of another modification of the fastening device made in accordance with the present invention.
Figure 9:
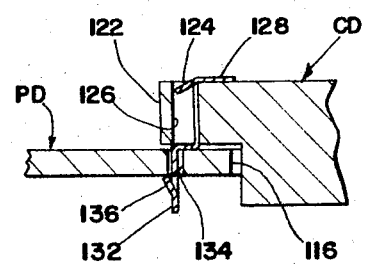
FIG. 9 is a sectional view showing one end of an article, such as an electrical connector, mounted through an opening in a support member by means of one of the fastening devices as shown in FIG. 8.

In FIGS. 8 and 9 there is illustrated another modification of the fastening device, designated generally at 2D, which is generally similar in application to that shown in FIGS. 3 and 4 for mounting a connector DC through an opening 116 provided in a similar type panel PD. In this form, however, the strip of material may be formed to provide what may be termed a double-stepped construction comprising a generally flat base 118 which is struck-out centrally thereof to provide within its margins a window-like opening 120 adapted to receive a flanged end 122 of the connector CD upon assembly with the fastener. The opening 120 is so struck-out as to provide a resilient finger 124 which projects outwardly and angularly downwardly from the general plane of the base 118 for engagement within a generally vertically extending opening 126 provided in the flanged end 122 of the connector, thereby to combine with the window construction 120 to prevent any movement of the connector in the assembled position with the fastener. The base 118 may be bent adjacent its upper end to provide a flange 128 which projects outwardly and generally normal to the base for engagement against the top or upper surface of the flanged end 122 upon assembly of the connector with the fastener.

In this form, the other end of the base 118 is preferably bent to provide another flange 130 which projects outwardly and normal to the base and on the opposite side relative to the flange 128 to define a shoulder-like construction for engagement with the top or upper surface of the panel adjacent the panel opening 116. The free end of the flange 130 may be bent downwardly to provide a generally vertically extending leg 132 having a substantially reduced transverse dimension compared to the transverse dimension of the flange 130 and which is adapted to be inserted through an aperture 134 provided in the panel adjacent the panel opening 116. The material of the leg 132 may be struck-out to provide a tab 136 which projects outwardly and upwardly therefrom for engagement against the bottom or undersurface of the panel adjacent the aperture 134, thereby to lock the fastener in snap-fastened engagement with the panel.

In assembly, a pair of the fasteners 2D are attached to the connector CD simply by inserting the flanged ends, such as end 122, of the connector through the window-like opening 120 provided in the base 118 of the associated fastener. Upon insertion, the resilient finger 124 snaps into engagement within the opening 126 provided in the flanged end to prevent movement of the fastener relative to the connector. The connector and depending fasteners may then be inserted, as a unit, through the opening 116 in the panel. Upon insertion of the connector, the leg 132 of the associated fastener is disposed through the aperture 134 in the panel so that the tab 136 snaps into engagement against the confronting underside of the panel. Thus inserted, the panel is clamped between the flange 130 and the tab 136 of the associated fastener, thereby to prevent movement of the connector relative to the panel in the installed position of the fasteners.

While this invention has been described in detail with specific examples, such examples are illustrative only since it will be apparent to those skilled in the art that other modifications within the spirit and scope of the invention may be constructed without departing from the teachings of essential characteristics thereof. The present embodiments are therefore to be considered in all respects as illustrative and not restrictive, the scope of the invention being indicated by the appended claims rather than the foregoing description.

I claim:

1. A fastening device for securing an article to a support member having an aperture therein comprising, a base having a window-like opening for slidably receiving therethrough a portion of said article, a retainer means extending outwardly adjacent the upper end of said window-like opening for engagement with the portion of said article received through said window-like opening, attachment means disposed adjacent the lower end of said window-like opening for securement of the device to said support member, said attachment means including a leg bent outwardly from the general plane of said base for engagement with the confronting underside of said support member, and a resilient tongue struck-out adjacent the bottom of said window-like opening for receiving therebetween a marginal portion of said support member.

2. A fastening device according to claim 1, including a resilient finger member struck-out adjacent the top of said window-like opening and extending outwardly from the general plane of said base for engagement with the confronting upper surface of the portion of said article received through said window-like opening.

3. A fastening device according to claim 1, wherein said leg includes a peripherally-continuous projection extending outwardly therefrom for engagement within a second aperture provided in said support member.

4. A fastening device for securing an article to a support member having an aperture therein comprising, a base having a window-like opening for slidably receiving therethrough a portion of said article, a retainer means extending outwardly adjacent the upper end of said window-like opening for engagement with the portion of said article received through said window-like opening, attachment means disposed adjacent the lower end of said window-like opening for securement of the device to said support member, said attachment means including a resilient arm struck-out from said base and extending outwardly adjacent the bottom of said window-like opening for engagement with the confronting upper side of said support member, and a projection means extending downwardly from said arm for engagement within a second aperture provided in said support member.

5. A fastening device according to claim 4, wherein said base is bent adjacent the upper end of said window-like opening to provide a curved flange extending outwardly therefrom for engagement with the confronting upper surface of that portion of said support member received through said window-like opening, and said flange including a finger portion extending downwardly therefrom in the general direction of said arm for engagement within an aperture provided in said article.

6. A fastening device according to claim 4, wherein the end of said base adjacent the lower end of said window-like opening is bent to provide a downwardly and inwardly projecting portion, said portion including a tab extending upwardly therefrom for engagement with the confronting undersurface of said support member adjacent the margin of the aperture therein.

7. A fastening device for securing an article to a support member having an aperture therein comprising, a base having a window-like opening for slidably receiving therethrough a portion of said article, a retainer means extending outwardly adjacent the upper end of said window-like opening for engagement with the portion of said article received through said window-like opening, attachment means disposed adjacent the lower end of said window-like opening for securement of the device to said support member, said base including a pair of spaced, parallel side walls extending outwardly therefrom and adapted to receive therebetween the portion of said article received through said window-like opening.

8. A fastening device according to claim 7, wherein said attachment means includes a generally L-shaped arm spaced laterally from said base and said side walls adapted to receive therebetween a marginal portion of said support member.

9. A fastening device according to claim 7, including a resilient projection extending inwardly adjacent the upper end of said window-like opening between said side walls and adapted for engagement with the confronting upper surface of the portion of said article disposed between said side walls.

10. A fastening device for securing an article to a support member having an aperture therein comprising, a base having a window-like opening for slidably receiving therethrough a portion of said article, a retainer means extending outwardly adjacent the upper end of said window-like opening for engagement with the portion of said article received through said window-like opening, attachment means disposed adjacent the lower end of said window-like opening for securement of the device to said support member, said retainer means including a flange portion projecting outwardly from said base adjacent the upper end of said window-like opening, and a resilient finger portion projecting outwardly and angularly downwardly in the direction opposite to said flange portion and adapted for engagement within an aperture provided in said article.

11. A fastening device according to claim 10, wherein said base includes another flange portion extending outwardly in the opposite direction from said first mentioned flange portion adjacent the lower end of said window-like opening and adapted for engagement with the confronting upper surface of said support member, a leg extending downwardly from said second mentioned flange portion adapted to be inserted through an aperture in said support member, and a resilient projection means extending outwardly from said leg adapted for engagement with the confronting undersurface of said support member.

References Cited by the Examiner
UNITED STATES PATENTS 3,131,447    5/1964   Tinnerman _____ 24—81

FOREIGN PATENTS 246,970   12/1960   Australia.
577,499    5/1933   Germany.

CLAUDE A. LE ROY, *Primary Examiner.*

J. F. FOSS, *Assistant Examiner.*